United States Patent Office 3,562,384
Patented Feb. 9, 1971

1

3,562,384
IMMUNOLOGICAL INDICATOR AND TEST SYSTEM
Edward Robert Arquilla, Pasadena, Calif., assignor to Miles Laboratories, Inc., Elkhart, Ind., a corporation of Indiana
No Drawing. Continuation-in-part of application Ser. No. 301,655, Aug. 12, 1963. This application June 28, 1966, Ser. No. 560,997
Int. Cl. G01n 31/00, 31/08
U.S. Cl. 424—12                                       5 Claims

ABSTRACT OF THE DISCLOSURE

The immunological indicator disclosed is made by attaching chemical coupling agents to microbial cells which serve as indicator particles. Any antigenic material can then be chemically attached thereto in order to form a specific indicator system for that antigenic material. A wide range of microbial cells and coupling agents may be used to form indicator systems which allow immunological tests to be conducted through the mechanisms of agglutination or inhibition of agglutination, and through a chromatographic technique.

---

This application is a continuation-in-part of my copending application Ser. No. 301,655, filed Aug. 12, 1963, now abandoned, which is a continuation-in-part of Ser. No. 167,898, filed Jan. 22, 1962, and issued Feb. 22, 1966 as Pat. No. 3,236,732, which is in turn a continuation-in-part of Ser. No. 67,890, filed Nov. 8, 1960, now abandoned.

This invention relates to an immunological indicator composed of microbial cells having a coupling agent attached thereto which can be chemically attached to antigenic substances in order to provide immunological indicator systems which can be used to visually detect homologous antigens or antibodies and to methods for making such immunological indicator and test systems and to devices based upon such indicator systems.

The ability to detect the presence of antigenic substances in various fluids has wide-spread significance. In many industrial processes proteinaceous materials having antigenic characteristics are either used as reactants or are acted upon in some manner. The ability to detect changes in concentration of these materials in order to follow such reactions is of primary significance in the control and reproducibility of these industrial processes. Another area of great significance is that of detecting various antigens and antibodies in body fluids. The levels of many of the hormones, proteins, lipoproteins, mucoproteins, glycoproteins, etc., and their hydrolysis products which occur naturally in the body as well as during various pathological conditions are of great significance to medical practitioners. Some of these substances of interest have been traditionally difficult to detect by use of standard analytical chemical methods. However, by employing immunochemical test procedures some of these antigens and antibodies are detectable in mixtures containing other large molecules having similar chemical groupings, but not having the precise stereo-configuration of the macromolecule of interest. A number of these immunological procedures have been difficult to perform and often lengthy and technically involved, but have been relied upon to detect the presence of such substances in various body fluids. For some antigens and antibodies no test procedure has been available.

More recently, hemagglutination systems have been perfected for detecting antigens or their antibodies. These systems employ red blood cells as indicator particles which, for use, are joined in some manner with an antigenic substance in order to provide an indicator system which can be used to detect the homologous antibody or the antigenic substance itself. For a determination of the presence or absence of the substance being tested by use of such systems, it is usually necessary to interpret the appearance of the pattern exhibited by the red blood cells in order to determine whether hemagglutination has occurred. Hemagglutination takes place when the homologous antibody is present in the test medium in a form which allows it to react with the antigenic substance coupled to the red blood cells and to form an immune complex therewith. Hemagglutination does not occur when the homologous antibody cannot complex with red blood cells to which the antigenic substance is coupled. Depending upon many conditions including buffers and other strongly reactive materials, this test procedure is of limited applicability and has a history of requiring skilled personnel to interpret the appearance of the resulting patterns although workable test systems have been established for some substances. Another troublesome difficulty associated with hemagglutination systems is that known as the heterophile antibody problem, which is caused by some of the serum proteins contained in the antiserum solution reacting with the antigenic groups naturally present on the surface of the red blood cells, even when the antiserum is taken from a species different from the animal species which produced the red blood cells used. Ovalbumin was early detected in serum in this manner according to Pressman, D., Campbell, D. H., Pauling, L.: Journal of Immunology, 44, pages 101–105 (1942). A similar method was employed to detect tuberculin purified protein derivative, Cole, L. R., Farrell, V. R.: Journal of Experimental Medicine, 102, page 157 (1955) and insulin was detected in serum by Arquilla, E. R. and Stavitsky, A. B. and reported in Journal of Clinical Investigation 35, pages 458–466 (1956). U.S. Pat. No. 3,236,732 to Edward R. Arquilla discloses a similar system for testing the hormone chorionic gonadotropin. A pathological antigenic substance, diphtheria toxoid was also tested in this manner, Butler, W. T.: Journal of Immunology, 90, pages 663–671 (1963).

It is now believed that the limited commercial use of this type of hemagglutination testing has been due, in part, to the narrow range of sizes and the peculiar configuration of the animal red blood cells which are usually employed and that greater use of agglutination immunological test systems could be realized if indicator particles for replacement of the red blood cells could be found which would allow a wider variation of size. Generally the use of animal red blood cells as indicator particles for various antigens precludes the use of either a chromatographic or a slide-type agglutination mechanism. Also the red blood cells are expensive to use commercially since laboratory animals must be maintained and the collection conditions must be carefully prescribed to avoid hemolysis of the cells and to promote uniformity without which the hemagglutination test canot be reproducibly carried out.

It has been discovered that microbial cells will serve as immunological indicator particles and will allow many of the former difficulties to be overcome. Microbial cells exist over a wide range of sizes and shapes and the sizes are within the ranges which are required for both tube and slide agglutination tests and for chromatographic type tests. Thus a variety of test mechanisms may be employed when microbial cells are used as the indicator particles. The cells are easily cultured under laboratory conditions and can be produced commercially at low cost. The microbial cells can be selected according to the size needed, the surface characteristics which are most advantageous for a particular test mechanism, and for ease in producing the same. Thus greater flexibility in the construction of immunological test systems is possible by use of microbial cells. Also by the use of microbial cells the heterophile antibody problem is eliminated.

As used herein "indicator particles" refers to the microbial cells without a coupling agent attached thereto, "immunological indicator" refers to the microbial cells with the coupling agent attached thereto, but without an antigenic substance coupled thereto, and "immunological indicator system" refers to the combination of cells, coupling agent and antigenic substance.

It is, therefore, an object of this invention to provide an immunological indicator composed of microbial cells and an attached chemical coupling agent to which antigenic substances may be covalently coupled and which can be used to visually indicate antigen-antibody reactions.

Another object of the present invention is to provide an immunological indicator for antigen-antibody reactions which consists of any of a wide size range of microbial cells.

Another object is to provide an immunological indicator system for use in the detection of an antibody wherein the indicator system is composed of microbial cells chemically coupled to the homologous antigen for said antibody through a chemical coupling agent.

Yet another object of the present invention is to provide an immunological indicator system for use in the detection of an antigen and for use in conjunction with the homologous antibody wherein the indicator system is composed of microbial cells chemically coupled to said antigen through a chemical coupling agent.

Yet another object is to provide immunological indicators of the above type in dry, powdered form supported by a bibulous material carrier to provide test devices based upon such systems.

The immunological indicator of the present invention may be briefly described as composed of microbial cells to which are chemically attached molecules of a coupling agent having at least one non-bonded reactive group thereon which is capable of forming a covalent bond with a reactive group in antigenic substances upon contact and reaction therewith. The indicator is made by suspending the microbial cells in a liquid and adding thereto the coupling agent which is capable of reacting with a reactive group on the surface of the microbial cells. The antigenic substance to be coupled to the microbial cells may be present in the same liquid suspension when the coupling agent is added so that a specific immunological indicator system is formed immediately or the substance may be added later to the prepared indicator. The coupling of the indicator to an antigenic substance forms an indicator system which can be used in a specific manner as hereinafter described.

The microbial cells of the immunological indicator and test system may be any self-reproducing micro-organism which is propagated with or without dependence upon other organisms. Both gram positive and gram negative bacterial cells can be used, fungal cells, and protozoological cells can be likewise employed, as can viral cells for some test systems. These are generally unicellular organisms which are occasionally joined in clumps or aggregates. The cells may be used in this form providing their aggregate size does not form a carrier particle which is so large that the test system formed with it will not agglutinate in the presence of a substance which is homologous to the antigenic substance bound to the aggregated cells. Generally, the preferred microbial cells are bacterial cells or aggregates thereof which are of uniform shape and size and have maximum external dimensions in one direction of about from 0.2 to 10 microns. While not preferred a mixture of different, but uniform cells may be used. For these bacteria the usable microbial cells include those in Division I of the Vegetable Kingdom including Classes I, II, and III, Order I. The Class III, Order I microbial cells include the intracellular viral organisms which have dimensions of about 0.2 micron.

Reference may be had to Bergey's Manual of Determinative Bacteriology by R. S. Breed, E. G. D. Murray, N. R. Smith, 7th edition, 1957, the Williams and Wilkins Company, for a complete listing of usable bacterial cells. Particularly useful are the bacteria of Class II, Suborder II, Family IV (Pseudomonodaceae) and Class II, Order IV, Family IV (Enterobacteriaceae). All Tribes I–V are considered to represent preferred microbial cells for the purpose of this invention. Also Class II, Order IV, Families V (Brucellaceae), X (Lactobacillaceae) and XIII (Bacillaceae) are considered preferred. Both Orders I and II of the Class III organisms can be employed where smaller sized particles of about 0.2 micron or under are desired. Particularly, the Order II Virales are of small dimension which limits their usefulness.

Specially preferred bacterial cells are *Brucella abortus, Escherichia coli, Bacillus subtilis, Bacillus pumilus, Lactobacillus leichmannii,* and *Pseudomonas fragi.* The yeast growth phases of the fungal cells are also preferred for use in the invention. Particularly preferred is the commonly available yeast, *Saccharomyces cerevisiae.*

The microbial cells may be used in their natural state, that is, the coupling agent may be reacted therewith and then the antigenic substance can be attached, through the coupling agent. However, if the natural pathogenic characteristics of any of the microbial cells is considered to be a danger, the natural antigenicity and hence pathogenic characteristics can be eliminated by treating or killing the microbial cells with preservative. The most common preservative agents are formaldehyde and phenol. It is notable that when microbial cells have been preservative-treated and then further altered by attaching coupling agents and antigenic substances, the naturally occurring antigenic groups on the cell surfaces are sufficiently modified to render them inactive. In order to completely eliminate any cells having natural antigenic activity the prepared test systems may be absorbed with serum containing the antibody to the antigen naturally present on the cell surfaces in order to form complexes which do not interfere with further testing. For example, when *E. coli* is used for the indicator particles of the indicator and antibodies to *E. coli* are present in the test sample, then the reaction between the indicator and its antibody can be blocked by adsorbing the *E. coli* cells indicator with antisera which contains the antibody thereto. Therefore, the microbial cells used in the present invention can no longer be considered to have natural antigenicity.

If desired, the microbial cells may be stained in order to improve the visual distinction of the resulting indicator system from the surrounding background. The ordinary stains such as hematoxylin, fuchsin, and crystal violet can be used for this purpose. Another optional treatment is to wash the cells with organic solvents such as alcohols, ethers, etc., to remove any polysaccharide or wax layers which may be present.

The coupling agents which can be chemically reacted with reactive groups of both the microbial cells and antigenic substances are generally compounds having two or more of the following reactive groups: azo, sulfonic acid, fluoro groups combined with nitro groups, azide, imine, and reactive chloro groups connected to a ring having proper resonance structures. These reactive groups are capable of reacting with the primary amino, sulfhydryl (mercapto), and hydroxyl groups in the polymer chains of the antigenic substances and of the microbial cell surfaces.

A representative list of known coupling agents is: bis-diazobenzidine, bis-diazobenzidine disulfonic acid, diazotized arsanilic acid, tetraazo-p-phenylenediamine, difluorodinitrobenzene, various carbodiimides, toluene diisocyanate, cyanuric chloride, dichloro-S-triazine, and N-t-butyl-5-methylisoxazolium perchlorate. Some of these coupling agents, notably the cyanurating agents, are capable of preserving the cells at the same time they couple to groups on the microbial cell surfaces so that no separate pretreatment for preservation of the cells is necessary with these coupling agents. For use of the last compound listed the indicator particles are first treated with a succinylation reagent such as succinic anhydride.

To form the immunological indicator the coupling agent is first reacted with the microbial cells which are suspended in a liquid and thereafter when needed this indicator is mixed with the antigenic substance to form an indicator system. That is, the indicator itself is considered a commercial article, since it can be prepared and sold for use by the customer in constructing test systems for any particular antigenic substance.

The preferred manner of contacting the microbial cells and the antigenic substance with the coupling agent to form the test systems is to suspend the microbial cells and antigenic substance in a liquid and add thereto the coupling agent with thorough mixing. Another manner of contacting is to simultaneously add the microbial cells and antigenic substance to a solution containing the coupling agent. These manners of contacting limit the cross-coupling of microbial cells and cross-coupling of antigenic substance molecules.

Generally, any antigenic substance can be coupled to the immunological indicator of this invention. An "antigenic substance" as used herein means a material which, when introduced into the circulatory system of an animal produces homologous antibody. This broad range includes serum antigens such as gamma globulin and serum albumin or blood grouping substances "A" and "B" to make tests for typing of blood. Microbial antigens can be coupled to the indicator for detecting either the microbe itself or its antibody in fluids. Antigenic hormone substances present in the fluid systems of organisms may also be coupled to the indicator. Also protein hydrolysis products and enzymes may be used as antigenic substances. The microbial antigens or antibodies can be of bacterial, fungal, parasitological, or viral nature. The primary requirement for the antigenic substance is that they have at least one group in their polymer chains which can react with the reactive group of at least one of the known coupling agents. All known antigenic substances are believed to meet this requirement.

The antigenic substance may be a naturally occurring material or may be an artifically prepared material. Some naturally occurring substances which can be coupled to the immunological indicator of this invention are ovalbumin, tuberculin purified protein derivative, insulin, the hormone chorionic gonadotropin (CGTH), both human and animal, human serum albumin, and horse gamma globin.

There are three general methods for conducting tests with the immunological indicator systems of the present invention. These are methods involving the principle of chromatography, those involving agglutination in a tube and those involving agglutination on a slide or plate. The particular method chosen largely determines the size of the microbial cells which are used.

For a chromatographic type test microbial cells having the form of ellipsoidal rods of from about 0.3 to 0.4 micron in length are preferred. For slide agglutination tests the microbial cells may be larger rods having lengths from 1–3 microns and diameters of about 0.5 micron, with the provision that the cells may be of coccoid form as well. A tube agglutination test can be constructed from a wide range of sizes of microbial cells including from about 0.2 micron to about 10 microns dimension in any one direction of length or diameter.

The slide and tube agglutination tests are based on the ability of the immunological indicator system to agglutinate and to thereby form a recognizable difference in pattern from the pattern exhibited in the absence of agglutination. This type of testing may be carried out in two general manners denoted for the first case as agglutination and for the second case as inhibition of agglutination. For agglutination an antigen is coupled to the microbial cell to form an indicator system and this is used to test for the presence of homologous antibody in a sample. If the sample contains the antibody, the indicator system will agglutinate with the antibody and his condition can be recognized by the pattern exhibited by the indicator system. For inhibition of agglutination the antigen is coupled to the microbial cell to form an immunological indicator system which is then employed with the homologous antibody to test for the presence of the antigen in a sample. If the sample contains the antigen, the homologous antibody will be inhibited or neutralized by said antigen and the indicator system will not be agglutinated. Under the condition of non-agglutination the indicator system consisting of insoluble microbial cells and the attached antigen will settle out of the test liquid to give a recognizable difference in pattern from the pattern exhibited by the agglutinated indicator system.

Agglutination in the case of a slide test is indicated by formation of a grainy pattern, whereas in a tube test agglutination is indicated by an even, uniform suspension of cells. The condition of non-agglutination in the case of a slide test is indicated by the formation of a smooth pattern and in the case of a tube test this condition is indicated by sedimentation of the indicator system in the bottom of the tube, either in a ring or in a spot pattern.

This same type of agglutination or inhibition of agglutination is responsible for the chromatographic type testing wherein if the sample tested contains the particular antigen or antibody there will be a particular migration characteristic presented by the chromatographic solution. In the case of an agglutination chromatographic type test a spot of the indicator system is deposited on a suitable chromatographic carrier, such as filter paper, and then a drop of the fluid sample to be tested for the presence of the antibody is placed on this same spot and the edge of the carrier is contacted with a chromatographic solution such as saline solution. If the sample contains the antibody, the indicator system will agglutinate and form an immune aggregate with the antibody. This aggregate will not move with the advancing chromatographic solution and little change of the spot will occur. If, however, the sample does not contain the antibody no immune aggregate will be formed and the indicator system will then migrate with the advancing solution to form a streaked pattern. In order to conduct an inhibition of agglutination chromatographic type test a spot of immune aggregate is formed by placing a drop of an antibody containing solution on a spot of deposited immunological indicator system. A drop of the sample to be tested for the presence of the antigen is then placed on the spot of immune aggregate and a solution allowed to advance up the carrier, or alternatively, the edge of the carrier may be directly contacted with the sample to allow the antigen, if present, to come into contact with the spot of immune aggregate. If the sample contains the antigen the immune aggregate will be dissociated due to the preferential reaction between the antibody and the antigen and the indicator system will migrate and present a streaked pattern. Of course, if no antigen is present in the sample no migration of the spot of immune aggregate will be exhibited.

The above objects and description are further detailed in the following examples which are to be construed as illustrative only and not limitative of the invention. Parts are by weight/volume and buffer concentrations are by molarity, M, unless otherwise specified.

EXAMPLE I

An immunological indicator system was made up using *Brucella abortus* cells as the microbial cells, bis-diazo-benzidine (BDB) as the coupling agent, and human chorionic gonadotropin (CGTH) as an antigen. This indicator system was then deposited upon a bibulous carrier member in association with the antibody to CGTH and urine samples were then tested for the presence of CGTH with the resulting device. This indicator device functioned by a chromatographic mechanism as hereinafter described.

Preparation of reagents

Isotonic saline.—a 0.85% saline solution was made up by dissolving 8.5 g. of sodium chloride in 1 liter of distilled water.

Phosphate buffer.—a 0.15 M buffer solution of pH 7.4 was prepared by dissolving a dry mixture of 81% disodium acid phosphate and 19% sodium diacid phosphate in distilled water until the desired pH was reached.

Bis-diazobenzidine-solution.—to 0.92 g. of benzidine there was added 100 ml. of distilled water and 6 ml. of 6 N hydrochloric acid. An additional volume of distilled water of 100 ml. was added to this mixture. After the benzidine had dissolved the solution was cooled to 0° C. in an ice-salt bath. As soon as ice crystals began to form in the solution, 6.5 ml. of a 10% solution of sodium nitrate were added rapidly with stirring. The stirring was continued until the solution was negative to starch-iodide paper. During the stirring the solution should never be allowed to reach a temperature above about 1° C.

This material was pale yellow in color. When phosphate buffer was added it turned reddish brown. The pale yellow solution was stable at room temperature from 5 to 7 hours; at 4° C. it was stable for about 7 days; when frozen and stored at −20° C. it was stable for about 60 days; and when stored below −35° C. it was stable for at least 6 months.

Formalinizing of microbial cells.—Brucella abortus cells were grown for 72 hrs. at 37° C. on tryptose agar and then washed off the agar with 0.85% saline solution containing 1% formaldehyde. The cells were immediately treated with formaldehyde by suspending them in a saline-formaldehyde solution for 24 hours at room temperature (25° C.). The cells were then thoroughly washed to remove the residual preservative. Washing *Brucella abortus* cells was accomplished by suspending the cells in distilled water. The cells were collected by centrifugation and resuspended in distilled water, the latter step being repeated several times. The preserved cells were then stained.

Staining of formalinized microbial cells.—2 g. of the wet packed formalinized *Brucella abortus* cells, 1 ml. of 2% ferrous sulfate and 5 ml. of 1% aqueous hemotoxylin were added to 100 ml. distilled water and stirred continuously for 24 hours. The cells stained permanently and the stain did not leach out.

Preparation of indicator system.—(Formalinized microbial cells-BDB-CGTH) *Brucella abortus* cells, stained with hematoxylin as above were used as indicator particles for human CGTH obtained from Vitamerican Corp., Little Falls, N.J. A volume of 0.5 g. of packed, stained cells were added to 10 ml. of saline containing 20 mg. of CGTH, and then 12 ml. of phosphate buffer and 40 ml. of diluted BDB solution prepared by mixing 8 ml. of the above BDB solution with 32 ml. of phosphate buffer were added. The coupling reaction proceeded under continuous agitation for 20 minutes at room temperature (25° C.). The resulting brown complex was then collected by centrifugation and washed 3 times by centrifugation with distilled water. Since it was desired to support this indicator system on a bibulous carrier member a 0.2 g. portion of the indicator system was homogenized in a mortar. It was thoroughly mixed with 1 drop of 1% merthiolate and 1 g. of sucrose syrup (75% w./v.) was then slowly added.

Preparation of antibody to CGTH.—Laboratory rabbits were injected with human CGTH in Freund's complete adjuvant in a series of injections. After a given period of time, the rabbits were bled and the serum containing the antibody was separated from the whole blood. The CGTH employed can be from any of the commercial distributors thereof. Particularly useful is that marketed by Vitamerican Corp. which has an activity of approximately 2000–2500 International Units (I.U.) per mg. A typical injection schedule and separation of the antibody is as follows: a solution containing 10 mg. per ml. CGTH in saline solution was mixed in equal proportions with Freund's complete adjuvant. One tenth (0.1) ml. of the mixture was injected into each toe pad of a rabbit which weighed 3.5 kg. At the end of a two week period a first booster of 0.5 ml. of a solution containing 5 mg. per ml. CGTH in saline solution was injected intravenously. Two days after the first booster injection a second was given. Samples of blood from the rabbit were withdrawn 7 days after the last booster injection. The antisera had a titre of 1/2560 as determined by hemagglutination.

Methods of testing (chromatographic).—A spot of the above prepared indicator system was placed about ¾ inch in from an edge of a piece of filter paper and a drop of the above antisera was placed thereon to form an immune aggregate. The edge of the paper was then placed in contact with a normal non-pregnant urine sample. As the urine ascended the paper, the spot of immune aggregate remained fixed on the paper. This showed that the immune aggregate formed was not dissociated by the normal urine components. Another filter paper strip was prepared with another spot of immune aggregate and the edge of the paper placed in contact with a urine sample from a pregnant woman. As the urine ascended the paper strip, a portion of the immune aggregate dissociated and caused a streaking or migration of the colored indicator system upward from the aggregate spot which was correspondingly lightened in color intensity.

In another test the spots of immune aggregate were formed on several paper strips and then the urine samples dropped onto these spots. The edges of the strips were then placed in contact with physiologic saline solution. When the saline solution moved past the spots treated with urine from a pregnant woman some of the colored indicator system migrated to cause a streaked pattern. Relatively little streaking was found when the saline solution moved past the spots treated with normal, nonpregnancy urine.

Test devices were constructed for testing for the presence of the antibody to human CGTH by placing spots of the above indicator system about ¾ inch in from an edge of pieces of filter paper. A drop of rabbit serum containing the antibody was then placed on a spot of indicator system on one of the strips and the edge thereof placed in contact with physiologic saline. The saline moved past the spot without streaking of the indicator system, indicating that an insoluble immune aggregate had been formed. A drop of normal rabbit serum was then similarly tested and the indicator system was found to migrate away from the spot, indicating that no immune aggregate had been formed.

The above indicator system also showed agglutination by antibody to human CGTH in tests performed by tube-type agglutinations. These agglutinations were readily inhibited by adding small amounts of a solution containing CGTH to the test medium.

When preparing the diagnostic composition on a bibulous carrier utilizing an indicator comprising microbial cells, it is essential that the cellular material be stabilized by preservative treatment as described hereinbefore.

Another indicator device may be constructed by mixing the above indicator system with the antibody to form an immune aggregate, depositing a single spot on an area spaced from the strip edge and drying. For use a drop of urine sample is placed on this spot or between this spot and the edge and the end of the strip is placed in a saline solution. If the urine contains CGTH the aggregate will be dissociated to allow the stained indicator system to move with the saline solution and present a streaked appearance. If no CGTH is present there will be no change.

Alternatively, the urine sample may be used as the chromatographic solution as above. In a preferred embodiment such a device is constructed by preparing the diagnostic reagent in strip form, which by way of example, comprises placing a band of the indicator system and antibody aggregate at about 15 mm. from the long edge of a 13 cm. x 26 cm. piece of Eaton-Dikeman No. 609 filter paper, allowing the reagent to dry at room temperature, cutting the paper into strips width-wise and storing in suitable containers until use.

It will be readily appreciated that many different materials may be used in the bibulous strip test. For example many types of chromatographic materials may be used as well as many types of developing chromatographic fluids.

EXAMPLE II

Escherichia coli was employed as indicator particles for constructing an immunological indicator system of microbial cells-BDB-CGTH. This indicator system was employed together with the antibody for CGTH to set up a slide type agglutination test and clinical evaluations of pregnancy were made therewith.

Preparation of reagents 0.85% saline solution.—68 g. of sodium chloride were dissolved in 8 liters of distilled water and the solution autoclaved at 15 p.s.i.g. and 250° C. for 30 minutes. It was then cooled and stored at 4° C. The autoclaving was carried out to sterilize the saline.

1% formaldehyde solution.—A 37% formalin solution was treated by adding powdered calcium carbonate to the solution and letting it stand for 24 to 48 hours. The supernatant was then poured into another container and filtered three times through high grade white filter paper, crepe surface. When the pH was lower than about 7.0 it was adjusted to this pH with 0.1% NaOH solution. A sufficient amount of this treated 37% formalin solution was added to distilled water to obtain a 1% solution.

Phosphate buffer solution.—100 ml. of a pH 7.4 phosphate buffer was made up by mixing 80.8 ml. of a sodium phosphate solution with 19.2 ml. of a potassium phosphate solution at 20° C. The sodium phosphate solution contained 53.726 g. of $Na_2HPO_4 \cdot 12H_2O$ per liter distilled water. The potassium phosphate solution contained 20.414 g. of $KH_2PO_4$ per liter distilled water.

Bis diazobenzidine (BDB).—0.640 g. of benzidine·2 HCl were dissolved in 100 ml. of a 0.56% HCl solution in a 250 ml. Pyrex Erlenmeyer flask. This flask was placed on an ice-filled magnetic stirring pan with a magnetic stirrer submerged in the solution. When the temperature reached 4° C. a 5 ml. aliquot solution of 4° C. sodium nitrite solution made by adding 0.680 g. of $NaNO_2$ to 10 ml. distilled water was taken up in a serological pipette and added, dropwise, to the benzidene solution uniformly over a period of 7 to 10 minutes with the magnetic stirrer at 200 r.p.m. (1 drop each 4 to 6 seconds). This solution was stirred continuously for 20 minutes after which time it was frozen immediately and kept at −60° C. in a number of one dram vials. This solution is liable to decompose even at 0° to 5° C. and therefore freezing was used to maintain stability. It can be raised to the temperature of use when needed.

Antibody to CGTH.—An emulsion containing 10 mg. of CGTH per ml. was made by dissolving 100 mg. of purified CGTH in 5 ml. of the above saline solution, adding 5 ml. of a thoroughly mixed Freund's complete adjuvant and shaking to produce an even emulsion. An amount of 0.2 ml. of the emulsion was injected into each foot-pad of a healthy rabbit maintained in standard laboratory environment for a total of 0.8 ml. of the emulsion (8 mg. CGTH).

The rabbit was thereafter given a series of injections each consisting of 0.5 ml. of a solution made by dissolving sufficient purified CGTH in the 0.85% saline solution to obtain a concentration of 5 mg. per ml. The injections were given in the ear veins. These subsequent injections were given on the following days after the first emulsion injection: days 22, 24, 38, 40, 71, and 73. Two samples of 40 to 50 ml. of blood were collected from the rabbit by cardiac puncture at each of days 50 and 83. The blood cells of these samples were then separated from the serum of each sample by allowing the blood to clot in a centrifuge tube, at approximately 25° C. for about 2 hours, the serum supernatant was then placed in a small diameter tube (less than 30 mm.) and the tube immersed in a 56° C. water bath for 30 minutes.

Ten mg. of formalinized sheep red blood cells (lyophilized) were then added for each ml. of the serum sample and mixed for 15 minutes at about 25° C. to absorb heterophile antibodies from the serum. The absorbed serum was then centrifugally separated from the cells at about 1000 times gravity.

A quantity of 40 ml. of packed sheep cells were prepared for this adsorption by centrifuging and siphoning off the supernatant from 200 ml. of fresh sheep red blood dispersed in Alserver's solution and thereafter washing three times with 0.85% saline solution using 120 to 200 ml. saline solution per wash. To these cells were added 460 ml. of the above saline solution and 500 ml. of a 3% formalin solution of pH 7.3. The resulting suspension was mixed and allowed to stand for 18 to 20 hours at 37° C. The cells were then removed by centrifugation and washed 5 times with about 200 ml. of distilled water per wash. Sufficient distilled water was added to obtain a 10% suspension of the cells. This suspension was stored at 4° C. until use for the adsorption.

Microbial cells.—E. Coli cells were obtained by culturing an intestinal swab from a dead laboratory rabbit in brain-heart infusion (BHI) broth. A volume of 68 ml. of a well growing culture (18 hours) was used to inoculate 3 liters of BHI which had been previously checked for sterility. The cells were then incubated for 4½ hours at 37° C. with shaking. The resulting cells were found to be of uniform size and shape.

Preparation of indicator system

The three liters of suspended E. coli cells were centrifuged at 10,000 r.p.m. for 10 minutes to separate the excess fluid from the packed cells. The supernatant was siphoned off and the remaining packed cells were contacted with approximately 45 ml. of 37% calcium carbonate treated formaldehyde solution in order to assure killing of the E. coli. The formalin was allowed to remain in contact with the cells for 1 hour after which time the cells were washed three times with the above saline solution and thereafter suspended in 1600 ml. of 1% formaldehyde solution for 41 hours at room temperature (25° C.). These cells were then centrifuged and recovered as packed preservative-treated cells. These packed cells were then resuspended with 500 ml. of the above saline solution and stored at 4° C. The concentration of cells was 4% as measured by a hematocrit.

A portion of the above suspension of cells was centrifuged to recover a packed cell volume and 0.5 ml. of the packed cells was removed and added to 10 ml. of the above saline solution to which had been added 20 mg. of CGTH, 12 ml. of the phosphate buffer and 40 ml. of diluted BDB solution prepared by combining 8 ml. of BDB with 32 ml. of the phosphate buffer. The CGTH had an activity of 3600 I.U. per mg. and was obtained from the Vitamerican Corp. This mixture was continuously agitated for 20 minutes at room temperature and thereafter the formed indicator system was recovered by centrifugation and washed three times with the above saline solution and thereafter centrifuged and resuspended in a 1:50 dilution of bovine serum albumin (30%) in the above saline solution. The bovine serum albumin, BSA, was obtained from Armour and Co.

The resulting suspension of the indicator system exhibited a brownish color and was found to be stable over a wide range of temperatures.

Preliminary testing with the indicator system

To determine the least detectable amounts of CGTH, normal urine samples were prepared by adding thereto known amounts of CGTH. The above prepared indicator system was then employed together with the above antibody to CGTH (Ab-CGTH) for conducting slide-type agglutination tests.

For this testing the above indicator system was resuspended in sufficient 1:50 BSA-saline solution to obtain an 8% concentration of cells. Next, three dilutions of the above antibody solution were prepared by diluting one part of the antibody solution with 250 parts of the above saline solution, 500 parts of the saline solution, and 1000 parts of the saline solution. These dilutions were labelled, respectively, 1:250, 1:500, and 1:1000. Urine samples of each of the following concentrations of CGTH were made up by adding 0.25 ml. of a stock solution of 4 mg. CGTH/ml. saline (3600 I.U./mg.) to 100 ml. of a non-pregnant normal female urine sample and then serially diluting with saline: 2.25, 4.5, 6, 9, 18 and 36 I.U. of CGTH/ml. urine and saline. A portion of the urine sample was set aside as a blank.

One drop of each of the urine samples was mixed with one drop of the appropriate antibody dilution nad mixed on a slide plate. Thereafter, one drop of the above 8% indicator system suspension was added to the cells already on the slide and mixed. The results of this series of tests are set out in Table 1, below, wherein — represents agglutination and therefore a grainy pattern in the suspension on the slide plate and + represents a smooth non-agglutinated pattern on the slide plate.

the 1:250 dilution. By Table 1 it can then be seen that very low amounts of about 4.5 I.U. CGTH/ml. urine can be detected by using low concentrations of Ab-CGTH in the testing system, namely 1:1000 dilutions or less. It has also been found that by doubling the urine used to two drops as low as 2 I.U. CGTH/ml. urine can be detected.

In order to test the exact times of development of the grainy patterns over a range of Ab-CGTH and cell concentrations the following additional testing was carried out.

Portions of indicator system were resuspended in sufficient of the above BSA 1:50 dilution in saline to make concentrations of 0.625%, 1.25%, 2.5%, and 5% cells. Next a series of Ab-CGTH solution dilutions were made with the above BSA, 1:50 in saline solution to obtain dilutions of: 1:125, 1:250, 1:500, 1:1000, 1:2000, 1:4000, 1:8000, and 1:16000. Four drops of each of the Ab-CGTH dilutions were dropped in separate parallel rows across the surface of a cross-hatched glass plate. To the first drop of each of these dilutions was added one drop of the lowest concentration of indicator system cells suspensions. To the second drop of each of the Ab-CGTH dilutions was added one drop of the 1.25% suspension, and to the third and fourth drops of each of the dilutions one drop of the 2.5% and 5% cell suspensions were added, respectively. The results are shown in Table 2, below, wherein the time for development of a grainy agglutination pattern is given in seconds for each of the test mixtures. An "S" indicates that there was insufficient Ab-CGTH at the particular antibody dilution to cause agglutination of the cells, and hence the pattern remained smooth.

TABLE 2.—AGGLUTINATION TIMES, SECONDS

| Indicator system concentration, percent | Dilutions of Ab-CGTH | | | | | | | |
|---|---|---|---|---|---|---|---|---|
| | 1:125 | 1:250 | 1:500 | 1:1,000 | 1:2,000 | 1:4,000 | 1:8,000 | 1:16,000 |
| 0.625 | 34 | 50 | 213 | 85 | 107 | 280 | S | S |
| 1.25 | 31 | 30 | 36 | 58 | 56 | 150 | 120 | S |
| 2.5 | 25 | 31 | 43 | 62 | 92 | 140 | S | S |
| 5.0 | 35 | 30 | 55 | 60 | 75 | S | S | S |

TABLE 1

| CGTH concentration in urine, I.U./ml. | Dilutions of Ab-CGTH | | |
|---|---|---|---|
| | 1:250 | 1:500 | 1:1,000 |
| 0 (blank) | − | − | − |
| 2.25 | − | − | − |
| 4.5 | − | − | + |
| 6.0 | − | + | + |
| 9.0 | + | + | + |
| 18.0 | + | + | + |
| 36.0 | + | + | + |

Table 1 shows that when no CGTH is present in the urine there is agglutination due to the fact that the urine specimen did not contain CGTH which can preferentially react with the Ab-CGTH and thus the antibody agglutinates with the indicator system and forms a grainy appearance of lumped or clumped cells over the wetted portion of the slide plate. By adding 2.25 I.U./ml. of CGTH to the urine sample there is still sufficient Ab-CGTH present in the system to react with all of the CGTH and to cause clumping of the cells or agglutination even at the 1:1000 dilution. When the urine sample containing 4.5 I.U/ml. was tested with the 3 dilutions of Ab-CGTH, the antibody is totally reacted with the CGTH between the dilutions of 1:500 and 1:1000 so that the pattern for the 1:1000 dilution is not grainy but is a smooth pattern of suspended indicator system cells indicating no agglutination. It can be seen that with 6.0 I.U. CGTH/ml. the necessary amount of antibody occurs between the dilutions of 1:250 and 1:500 as would be expected since a greater amount of CGTH is present and therefore a greater amount of Ab-CGTH is necessary to completely react with the CGTH in order to cause a grainy pattern to appear at The times for agglutination recorded in Table 2 show that a relatively short time period is necessary to determine the fact of agglutination which in an actual test represents a negative for pregnancy. Hence, pregnancy can be ruled out by a slide agglutination test with the above indicator system in about one minute or less. This is a far shorter time period than is required for the tube-type agglutination systems based on red blood cells. Also, the patterns distinguishing the agglutination from the nonagglutination are very clearly marked and there are essentially no intermediate doubtful patterns shown by these tests. It is thus possible to select the reagents so that clearly defined patterns required for diagnosis of pregnancy can be obtained.

Table 2 also shows that a wide range of Ab-CGTH dilutions can be employed as can a wide range of indicator concentrations. The concentration of the indicator system in BSA 1:50 dilution in saline can be from less than 1% to about 12% for a usable test system.

In order to test the indicator system of Example II with actual urine samples sixteen urine samples were obtained from sixteen non-pregnant females, four of them being on regular contraceptive pill programs. The method of testing was the same as stated above. That is, one drop, of the urine sample was mixed with one drop of a 1:1000 Ab-CGTH dilution and then one drop of this mixture was placed on a glass slide and one drop of a 4% suspension of the above indicator system was added to the mixture already present on the slide. In all 16 cases a grainy pattern indicating agglutination and therefore no pregnancy was found. This testing gives limited proof that false positive results are not a difficulty of the above indicator system and that, for this particular type of testing, hormone levels resulting from active contraceptive programs do not interfere.

Clinical testing using indicator system

Thirty-one (31) frozen urine samples were received and tests were carried out as a blind study, wherein the conditions of the patients from whom the samples had been taken were unknown. One known pregnant urine was included as a control and one know non-pregnant urine was included as another control. Slide tests were carried out in the above manner and compared against slide tests run on the same urine samples with a commercially available slide test for pregnancy based on an indicator system of latex particles in combination with CGTH.

The indicator system was used as a 4% suspension. The antibody solution consisted of a 1:1000 dilution of the above antibody solution in saline. The procedure of testing was to mix one drop of each of the urine samples together with one drop of the antibody solution and to then place one drop of this mixture on a clean glass slide surface and add thereto one drop of the 4% indicator system suspension and mix. The results were then recorded as positive, +, for the presence of smooth pattern showing that the agglutination was inhibited and hence indicating pregnancy and a negative, —, for the presence of a grainy pattern showing agglutination and hence indicating on-pregnancy.

The commercially available test was carried out in strict accordance with the packaged instructions and the results were recorded with respect to presence or absence of pregnancy. The results were as set out in Table 3, below.

TABLE 3.—CLINICAL STUDY RESULTS

| Unknown urine sample No. | Indicator system of Ex. II | Commercial pregnancy test |
| --- | --- | --- |
| 1 | + | — |
| 2 | + | — |
| 3 | + | + |
| 4 | + | + |
| 5 | + | — |
| 6 | + | — |
| 7 | + | + |
| 8 | + | (¹) |
| 9 | + | + |
| 10 | + | — |
| 11 | + | — |
| 12 | + | + |
| 13 | + | + |
| 14 | + | + |
| 15 | + | + |
| 16 | + | — |
| 17 | + | — |
| 18 | + | — |
| 19 | + | + |
| 20 | + | — |
| 21 | + | + |
| 22 | + | (¹) |
| 23 | + | — |
| 24 | + | + |
| 25 | + | — |
| 26 | + | + |
| 27 | + | + |
| 28 | + | + |
| 29 | + | + |
| 30 | + | (¹) |
| 31 | + | (¹) |

¹ Not run.

It can be seen from the above table that all of the 31 urine samples were indicated to be from pregnant women according to the indicator system of Example II. Eleven (11) out of the 27 urine samples which were tested with the commercially available pregnancy test were indicated to be negative, indicating no pregnancy. When the blind was revealed it was discovered that all of the unknown urine samples had been from pregnant females, gestation varying from a few weeks to 8½ months.

The one pregnancy urine and one known non-pregnancy urine were tested only with the indicator system of Example II and were not, therefore, included in Table 3. The results were as expected, a negative for the non-pregnant and a positive for the pregnant urine which was from the 8th week of gestation.

EXAMPLE III

In distinction to Example II, above, an indicator system was made according to a two stage reaction by adding the first the $E.\ coli$ cells to a buffer solution and thereafter adding a BDB solution to form an immunological indicator. To prepare an indicator system a solution of CGTH was thereafter added and the coupling reaction carried out.

Preparation of reagents

Saline phosphate buffer, pH 7.0.—150 ml. of a disodium phosphate-saline solution was titrated to pH 7.0 with 75 ml. of a monosodium phosphate-saline solution. The first solution was made by mixing 150 ml. of 0.5 M $Na_2HPO_4 \cdot 7H_2O$ solution with 350 ml. of distilled, deionized water and 500 ml. of 0.85% saline solution. The monosodium phosphate-saline solution was made by mixing 150 ml. of 0.5 M$NaH_2PO_4 \cdot H_2O$ with 350 ml. of distilled, deionized water and 500 ml. of 0.85% saline solution.

Saline phosphate buffer, pH 7.5.—180 ml. of the above disodium phosphate-saline solution was titrated to pH 7.5 with the above monosodium phosphate-saline solution.

BDB solution.—1 volume 0.025 M benzidine·2HCl in 0.36 M HCl was added to one volume of 0.1 M $NaNO_2$ in distilled deionized $H_2O$, and the resulting mixture allowed to react for two minutes. It was then titrated to pH 7.0 with an equal volumes mixture of the above saline phosphate buffer, pH 7.0, and 0.31 M NaOH in distilled water. Immediately thereafter 6 ml. and 2 ml. aliquots of the BDB solution were placed in containers, which were capped, sealed, and frozen to —118° F. The BDB was thawed out to 4° C. as needed.

$E.\ coli$ cells were formalinized in the manner set out in Example II and were then prepared as a 1.4% cell suspension and pipetted into a 50 ml. centrifuge tube and centrifuged at 3100 r.p.m. for 15 minutes. The supernatant was then discarded and the packed cells resuspended by first mixing on a vortex until a smooth preparation was visible and then adding 20 ml. of the saline solution of Example II. The cells were then centrifuged and a supernatant discarded. This saline wash was duplicated for two further washings. An amount of 0.2 ml. of the resulting packed cells were then suspended in 2 ml. of the above saline solution. This suspension was then stored at 4° C. for 1 hour. After this time 2 ml. of a 1:5 dilution of the above BDB solution in the phosphate solution of Example II were added and placed on a rotary shaker at 4° C. for 30 minutes in the dark. The cells were then centrifuged for 5 minutes at 4° C. and washed twice with 4 ml. of cold saline-phosphate buffer, pH 7.5, to produce a relatively stable suspension.

Thereafter, 1.6 ml. of cold saline-phosphate buffer, pH 7.5 and 0.8 ml. of CGTH in 6 ml. of saline (4 mg./ml.) were added to the cell suspension. The resulting indicator system was prepared for testing by washing the preparation once with 25 ml. of BSA 1:50 in saline, centrifuging at 3000 r.p.m. for 5 minutes and resuspending with a vortex. A 0.9 ml. solution of BSA 1:50 in saline was then added to resuspend the indicator system for storage in a refrigerator. A 0.3 ml. portion of the above preparation was placed on a shaker at room temperature for 4 hours. The suspension was then placed on a shaker at 37° C. for 1 hour. The suspension was then washed two times in the above saline solution and one time with BSA 1:50 in saline. The cells were then resuspended to 0.3 ml. in BSA 1:50 in saline to give a 10% cells concentration.

An indirect agglutination test was thereafter carried out by mixing one drop of the cell suspension with one drop each of three increasing antibody solution dilutions. The dilutions were 1:250, 1:500 and 1:1000. A smooth pattern indicating a good indirect agglutination was formed for both of the 1:1000 dilution, while not as strong as the other two, was considered to be a smooth agglutination. This demonstrates that the indicator material of the present invention may be made and stored separately and thereafter employed to couple antigenic materials which can be used later for testing.

EXAMPLE IV

An immunological indicator system was made up for testing urine samples for the presence of CGTH by coupling human CGTH onto yeast cells by the chemical coupling agent BDB. The indicator system was used in conjunction with the antibody for CGTH to carry out an inhibition of agglutination test.

One (1.0) gm. of *Saccharomyces cerevisiae* was weighed out and washed three times with 200 ml. of the above saline solution. The yeast employed was that marketed under the trade designation Fleischmann's Active Dry Yeast. The yeast cells were then resuspended in 400 ml. of 1% formaldehyde solution in saline. The suspension was left at room temperature for 24 hours with occasional shaking. The cells were then centrifuged at 2000 r.p.m. for 10 minutes and the packed cell volume removed and stored in 200 ml. of the above saline solution at 4° C. This suspension showed a hematocrit value of 1.4%.

To 0.5 ml. of the packed formalinized yeast cells was added 12 ml. of the above phosphate buffer and then 6 ml. of a saline solution which contained 20 mg. CGTH/ 10 ml. and thereafter the cells were contacted with 40 ml. of a 1:5 dilution of the above BDB solution. The reaction proceeded with continuous agitation for 20 minutes at room temperature. The resulting indicator system was collected by centrifugation and washing three times in the above saline after which the packed cells were resuspended in BSA 1:50 dilution in saline. The resulting suspension showed a hematocrit value of 6%.

This 6% cell suspension was then used with 1:500 Ab-CGTH dilution to test for the presence of CGTH in two urine samples. A 0.2 ml. portion of the 6% cell suspension was washed once and diluted with BSA 1:50 in saline to the original concentration in order to have a final volume of 0.2 ml. One drop of a known pregnant urine was mixed with one drop of the Ab-CGTH solution and left for 2 minutes, then a single drop of the mixture placed on a glass slide. One drop of the indicator system was then mixed with the material on the slide. A smooth pattern appeared indicating pregnancy. The test was repeated with a nonpregnancy urine and a grainy, agglutinated pattern formed in a short time.

This example illustrates that yeast cells may be used as the indicator particles for the indicator systems. These cells offer the advantage of being presently commercially available in a dry-stable form.

EXAMPLE V

An indicator system was made by using *E. coli* as the microbial cells, a carbodiimide as the coupling agent, and CGTH as the antigenic substance. This indicator system was then used for both agglutination and inhibition of agglutination testing.

Preparation of reagents

Microbial cells.—*E. coli* cells were grown, harvested and treated with formaldehyde in the manner described in Example II. A volume of 20 ml. of a 2.5% suspension was prepared in this manner. This suspension was centrifuged and 0.5 ml. of packed cells recovered for use in making up the indicator system.

Coupling agent.—0.2 g. of N,N′-dicyclohexylcarbodiimide was dissolved in 0.5 ml. of tetrahydrofuran and then 1.0 ml. distilled water was added to the solution.

Antigenic substance.—40 mg. of CGTH was dissolved in 2 ml. of distilled water. The CGTH used had an activity of 2590 I.U./mg. and was obtained from Vitamerican Corp., Little Falls, N.Y.

Ab-CGTH solution.—Portions of the antibody solution and the 0.85% saline solution prepared for Example II were used to make up dilutions of 1:50, 1:100, and 1:200 of the Ab-CGTH.

Preparation of indicator system

The 0.5 ml. packed cells volume of *E. coli* cells was washed 5 times with cold water and then suspended in the 2 ml. of CGTH solution. The coupling agent solution was then added to the suspended cells and CGTH in order to couple the same. The mixture was shaken and then set aside for 24 hours at 25° C. The following washings were then carried out to free the indicator system formed from any entrained impurities; three times with 0.01 M sodium carbonate solution, three times with 0.01 M HCl, three times with distilled water, once with 1% NaCl (pH 2.3), once with a 1:20 dilution of the saline phosphate of Example III in 0.85% saline solution (pH 7.0), and once with a 1:50 dilution of BSA in 0.85% saline solution. The washed indicator system was then resuspended to an 8% cell concentration in BSA 1:50 in 0.85% saline. This 8% suspension was stored in a cold room and removed for the testing as set out below.

A preliminary agglutination was carried out by mixing one drop of each of the above antibody dilutions with one drop of the indicator system suspension at separate areas on a glass plate. A control was run by mixing one drop of a 1:50 dilution of normal rabbit serum (NRS) in 0.85% saline with one drop of the indicator system suspension at a separate area of the same plate. The results are set out in Table 4, below, wherein, the "S" denotes a smooth and hence a non-agglutinated pattern and "G" denotes a grainy and hence an agglutinated pattern.

TABLE 4.—INDIRECT AGGLUTINATION TESTS

| Indicator system | Antibody dilutions | | | Control NRS |
| --- | --- | --- | --- | --- |
| | 1:50 | 1:100 | 1:200 | |
| Example V, 8% | G | G | S | S |

Table 4 shows that agglutination occurred at the 1:50 and 1:100 dilutions but that insufficient Ab-CGTH was present at the 1:200 dilution to cause agglutination of the indicator system. The control showed a smooth pattern, indicating that the system does not spontaneously agglutinate with the NRS solution.

Further testing was carried out by mixing 0.5 ml. of a pregnancy urine sample with 0.5 ml. of the 1:100 antibody dilution in a test tube and letting this mixture stand for 5 minutes at 25° C. One drop was then removed from the test tube and mixed with one drop of the 8% indicator system suspension on a glass slide. An "S", smooth pattern was observed, indicating that the agglutination of the indicator system by the Ab-CGTH had been inhibited by the CGTH present in the urine sample.

The test was repeated using 0.5 ml. of a non-pregnancy female urine sample with the result that a "G," grainy, pattern developed in a short time.

This example shows that a carbodiimide can be employed as a coupling agent for attaching antigenic substances to microbial cells.

EXAMPLE VI

Two additional indicator systems were made following Example V. The antigens used were human serum albumin (HSA) and horse gamma globulin. The indicator system for HSA was made by using 10 mg. HSA per 0.25 ml. of packed cells volume of *E. coli* in place of the CGTH. The indicator system for horse gamma globulin was made by using 40 mg. of this antigen per 0.25 ml. of packed cells volume of *E. coli* in place of the CGTH.

Agglutination testing was carried out by mixing one drop of each of the prepared indicator systems with one drop of a 1:10 dilution of their respective antisera in 0.85% saline. A control for each test was run by using one drop of a 1:10 dilution of normal rabbit serum in 0.85% saline.

The antisera drops each caused a good agglutination pattern of the respective indicator systems. No agglutination was caused by the normal rabbit serum.

EXAMPLE VII

The indicator systems and agglutination tests of Example VI were duplicated with identical results by using N-t-butyl-5-methylisoxazolium perchlorate rather than the carbodiimide coupling agent.

This coupling agent was used by taking 10 ml. of a 2.5% suspension of the formalinized cells of Example II and centrifuging for 5 to 10 minutes to remove the supernatant solution. The cells were then washed four times with cold water and then resuspended in 20 ml. of 0.1% sodium bicarbonate in distilled water. A quantity of 3 mg. of succinic anhydride was then added and the cells shaken overnight at 4° C. The cells were then centrifuged and washed an additional three times with water after which the succinylated cells were resuspended in 5 ml. of distilled water. A pipette was then used to add 10 micro-liters of triethylamine to the cells. Next 17 mg. of N-t-butyl-5-methylisoxazolium perchlorate was added. This coupling agent is also known as Woodward's Reagent "L." The immunological indicator thus formed was used to couple the antigens set out in Example VI in the amounts therein given. Human serum albumin and horse gamma globulin coupled to *E. coli* by the above method when reacted with 1:10 rabbit anti-human serum albumin and 1:10 rabbit anti-horse gamma globulin gave agglutinations. No agglutination was caused by the 1:10 normal rabbit serum.

EXAMPLE VIII

Twelve different indicator systems were prepared by following Example II as to the manner of formalinizing the microbial cells and coupling antigens thereto by use of BDB. The microbial cells used were: *Bacillus subtilis, Bacillus pumilus, Lactobacillus leichmannii,* and *Pseudomonas fragi* and the antigens used with each of these indicator particles were HSA, horse gamma globulin, and human insulin. Agglutination slide-type tests were carried out.

The *B. subtilis* and *B. pumilus* were grown in the same manner as the *E. coli* of Example II. *L. leichmannii* was grown for the same time at the same temperature of 37° C. in a broth composed of: 890 ml. of water, 100 ml. of tomato juice filtrate, 10 ml. of "Bacto-Tween 80," 7.5 g. of yeast extract, 7.5 g. of peptone, 10 g. of dextrose, and 2 g. of disodium phosphate. The broth had a pH of 6.8 and had been autoclaved for 10 minutes at 121° C. under 15 p.s.i.g. to sterilize.

The *P. fragi* was cultured for 4.5 hours at room temperature (25° C.) in a previously sterilized broth composed of: 1 l. of water, 5 g. of tryptone, 5 g. of yeast extract, 1 g. of dextrose, and 1 g. of disodium phosphate.

The harvested cells were then formalinized and 0.25 ml. of a packed cells volume of each used according to the coupling method of Example II, by suspending three batches of each of these cells in 6 ml. of the phosphate buffer of that example and then adding to each of the portions of the suspended cells the following antigens dissolved in 5 ml. of 0.85% saline: 3 mg. HSA, 40 mg. of horse gamma globulin, and 20 mg. of insulin. Thereafter 20 ml. of a 1:5 dilution of the BDB solution of Example II in phosphate buffer was added to carry out similar coupling reactions.

Each of the twelve indicators were tested with their respective antibodies and with normal serum controls. The HSA and horse gamma globulin indicator systems were tested with a 1:50 dilution of rabbit anti-HSA and rabbit anti-horse gamma globulin, respectively, in saline, while the insulin indicator systems were tested with an undiluted guinea pig antiinsulin serum in saline. The controls for each of the twelve tests were run with a 1:10 dilution of normal rabbit serum in saline. The antibodies to each of the antigens agglutinated each of the four indicator systems made with the individual antigens and no agglutination was found in the controls.

By the present invention a wide range of immunological indicators of the type "microbial cells-coupling agent" are provided. These may be attached to antigenic substances to provide immunological indicator systems of the type "microbial cells-coupling agent-antigenic substance" which can be used to construct a wide range of tests and devices for testing.

What is claimed is:

1. An immunological indicator system comprising discrete bacterial cells of uniform shape and size selected from the group consisting of *E. coli, B. abortus, B. subtilis, B. pumilus, L. leichmannii* and *P. fragi,* a coupling agent covalently bound thereto selected from the group consisting of bis diazobenzidine, diazotized arsanilic acid, bis diazobenzidine disulfonic acid, tetraazo-p-phenylenediamine, difluorodinitrobenzene, dicyclohexylcarbodiimide, toluene, diisocyanate, cyanuric chloride, dichlorotriazine and N-t-butyl-5-methylisoxazolium perchlorate and a proteinaceous, natural occurring antigen selected from the group consisting of ovalbumin, insulin, hormone chorionic gonadotropin, human serum albumin and horse gamma globulin covalently bound to said coupling agent.

2. An indicator system as in claim 1 comprising *Brucella abortus* and hormone chorionic gonadotropin covalently bound to bis diazobenzidine.

3. An indicator system as in claim 1 comprising *Escherichia coli* and hormone chorionic gonadotropin covalently bound to bis diazobenzidine.

4. An indicator system as in claim 1 comprising *Bacillus subtilis* and insulin covalently bound to bis diazobenzidine.

5. An indicator system as in claim 1 comprising *Pseudomonas fragi* and horse gamma globulin covalently bound to bis diazobenzidine.

References Cited

UNITED STATES PATENTS

| | | | |
|---|---|---|---|
| 2,957,808 | 10/1960 | Campbell | 167—78 |
| 3,074,853 | 1/1963 | Brewer | 167—84.5 |
| 3,096,250 | 8/1963 | Ingraham | 167—84.5 |

OTHER REFERENCES

Pressman, J. Immunol., vol. 44, 1942, pp. 101–105.

Gittens, Biochimica & Biophysica Acta., vol. 66, Mar. 19, 1963, pp. 237–249.

Ling, J. Med. Lab. Tech., November 1960, pp. 94–101.

STANLEY J. FRIEDMAN, Primary Examiner

D. J. FUNDERBURK, Assistant Examiner

U.S. Cl. X.R.

424—8, 11

PO-1050
(5/69)

UNITED STATES PATENT OFFICE
CERTIFICATE OF CORRECTION

Patent No. 3,562,384          Dated February 9, 1971

Inventor(s) Edward Robert Arquilla

It is certified that error appears in the above-identified patent and that said Letters Patent are hereby corrected as shown below:

Column 2, line 38 - change "qonadotropin"
                    to -- gonadotropin --

Column 6, line 3 - change "his" to -- this --

Column 11, line 25 - change "nad" to -- and --

Claim 1, line 9 - delete the comma after "toluene".

Signed and sealed this 22nd day of June 1971.

(SEAL)
Attest:

EDWARD M. FLETCHER, JR.          WILLIAM E. SCHUYLER, JR.
Attesting Officer                Commissioner of Patents